United States Patent
Keith et al.

(10) Patent No.: US 9,238,512 B1
(45) Date of Patent: Jan. 19, 2016

(54) PORTABLE PASSENGER BOARDING RAMP ASSEMBLY

(71) Applicants: William Floyd Keith, White City, OR (US); Christa Keith, White City, OR (US)

(72) Inventors: William Floyd Keith, White City, OR (US); Christa Keith, White City, OR (US)

( * ) Notice: Subject to any disclaimer, the term of this patent is extended or adjusted under 35 U.S.C. 154(b) by 0 days.

(21) Appl. No.: 14/326,976

(22) Filed: Jul. 9, 2014

Related U.S. Application Data

(60) Provisional application No. 61/967,606, filed on Mar. 24, 2014.

(51) Int. Cl.
  *E01D 15/00* (2006.01)
  *B64F 1/315* (2006.01)
  *B65G 69/30* (2006.01)

(52) U.S. Cl.
  CPC ............. *B64F 1/315* (2013.01); *B65G 69/30* (2013.01)

(58) Field of Classification Search
  CPC .................................. B64F 1/315; B65G 69/30
  USPC ................... 14/69.5–71.5, 69.5–7.52
  See application file for complete search history.

(56) References Cited

U.S. PATENT DOCUMENTS

| | | | |
|---|---|---|---|
| 3,060,471 A * | 10/1962 | Der Yuen et al. | 14/71.5 |
| 3,537,745 A | 11/1970 | Herring, Jr. | |
| 3,664,456 A | 5/1972 | Smith, Sr. et al. | |
| 3,779,596 A | 12/1973 | Ritter | |
| 3,910,264 A | 10/1975 | Mahieu | |
| 4,690,606 A | 9/1987 | Ross | |
| 5,524,318 A | 6/1996 | Thomas | |
| 6,487,742 B1 * | 12/2002 | Beazer et al. | 14/71.5 |
| 6,668,411 B1 * | 12/2003 | Anderberg | 14/69.5 |
| 7,836,536 B2 | 11/2010 | Motohashi et al. | |
| 8,505,140 B2 * | 8/2013 | Anderberg | 14/71.1 |
| 8,622,173 B2 | 1/2014 | Fuqua et al. | |
| 2006/0070193 A1 * | 4/2006 | Hutton et al. | 14/71.5 |
| 2010/0306930 A1 | 12/2010 | Cesarini | |
| 2013/0047352 A1 | 2/2013 | Corfield | |

* cited by examiner

*Primary Examiner* — Raymond W Addie
(74) *Attorney, Agent, or Firm* — Jerry Haynes Law

(57) ABSTRACT

A portable passenger boarding ramp assembly includes a main chassis having a plurality of drive wheels; a ramp structure carried by the main chassis, the ramp structure including a lower ramp sloping upwardly to the main chassis; a lower turndeck carried by the main chassis at an upper end of the lower ramp; a mid ramp carried by the main chassis, the mid ramp sloping upwardly from the lower turndeck; an upper turndeck carried by the main chassis at an upper end of the mid ramp; an upper ramp carried by the main chassis, the upper ramp sloping upwardly from the upper turndeck; and a level deck carried by the main chassis and disposed in vertically pivoting relationship to the upper ramp; and a drive system drivingly engaging the plurality of drive wheels.

18 Claims, 10 Drawing Sheets

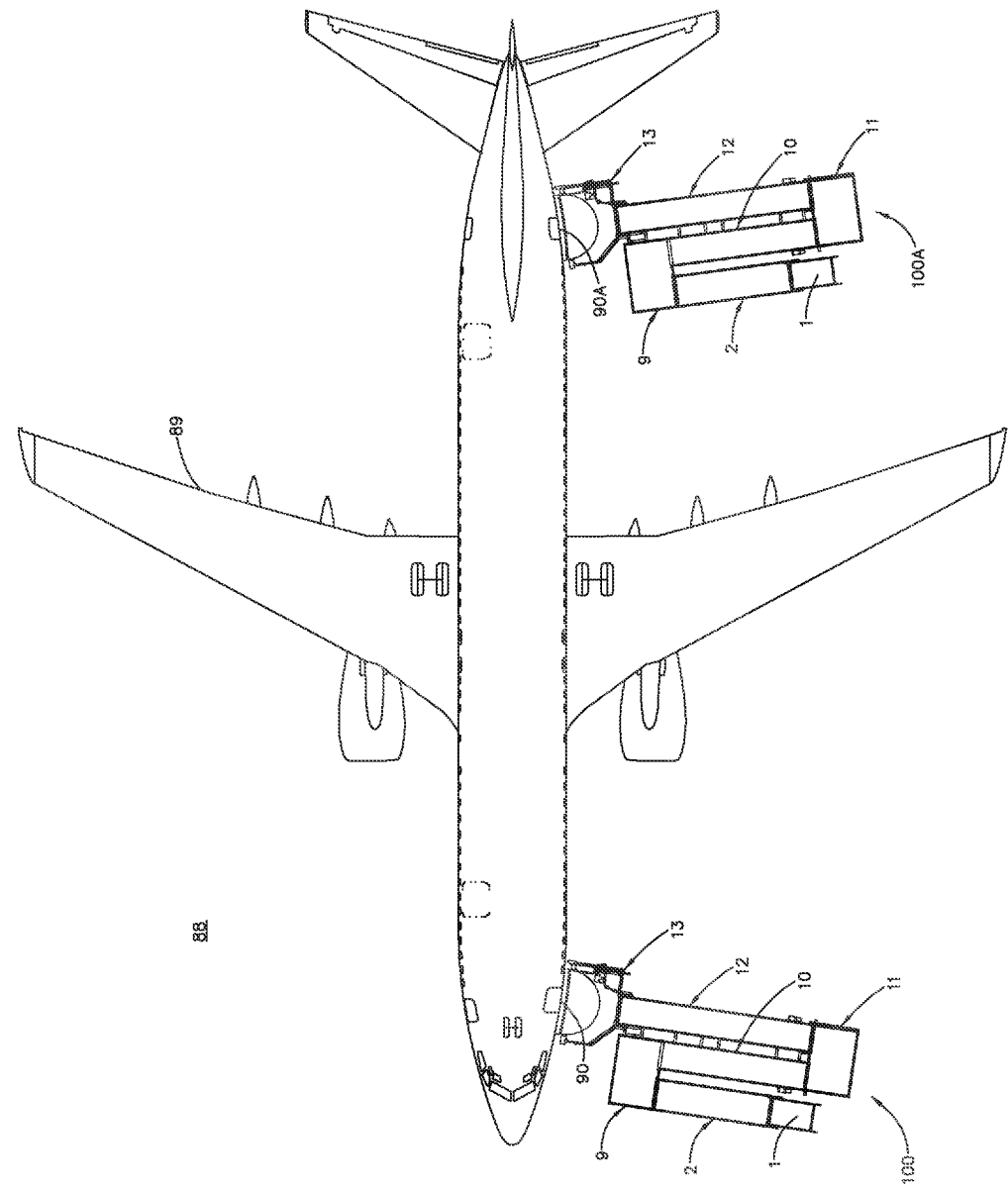

PORTABLE PASSENGER BOARDING RAMP ASSEMBLY

CROSS-REFERENCE TO RELATED APPLICATIONS

This application claims the benefit of U.S. provisional application No. 61/967,606, filed Mar. 24, 2014 and entitled "SOLAR POWERED DRIVEABLE PORTABLE PASSENGER BOARDING RAMP", which provisional application is incorporated by reference herein in its entirety.

FIELD OF THE INVENTION

Illustrative embodiments of the disclosure relate to boarding and deplaning ramps for passenger aircraft. More particularly, illustrative embodiments of the disclosure relate to a portable passenger boarding ramp assembly which may be solar powered and can be docked with commercial aircraft to facilitate the boarding and deplaning of passengers.

BACKGROUND OF THE INVENTION

Current systems and methods for deployment of a portable passenger boarding ramp in docking relationship to an aircraft requires the passenger boarding ramp to be towed behind a towing apparatus to within 50 to 60 feet of the parked aircraft. The passenger boarding ramp must then be manually pushed the remaining distance to the aircraft to facilitate docking of the ramp with the aircraft.

Illustrative embodiments of the disclosure relate to systems and methods for deployment of portable passenger boarding ramps in docking relationship to aircraft. More particularly, illustrative embodiments of the disclosure relate to systems and methods for deployment of portable passenger boarding ramps in docking relationship to aircraft without the need for a towing apparatus or ground operating personnel to push the ramp to the aircraft. Specifically, illustrative embodiments of the disclosure relate to a solar powered portable passenger boarding ramp that can be driven up to and positioned at an aircraft without the need for a towing apparatus or individuals to push the ramp given its unique drive system.

SUMMARY OF THE INVENTION

Illustrative embodiments of the disclosure are generally directed to a portable passenger boarding ramp assembly that can be used for deplaning passengers from and boarding passengers on an aircraft. An illustrative embodiment of the ramp assembly includes a main chassis having a plurality of drive wheels; a ramp structure carried by the main chassis, the ramp structure including a lower ramp sloping upwardly to the main chassis; a lower turndeck carried by the main chassis at an upper end of the lower ramp; a mid ramp carried by the main chassis, the mid ramp sloping upwardly from the lower turndeck; an upper turndeck carried by the main chassis at an upper end of the mid ramp; an upper ramp carried by the main chassis, the upper ramp sloping upwardly from the upper turndeck; and a level deck carried by the main chassis and disposed in vertically pivoting relationship to the upper ramp; and a drive system drivingly engaging the plurality of drive wheels.

In view of the foregoing disadvantages inherent in the current method of deployment of portable passenger boarding ramps, the portable passenger boarding ramp of the present disclosure can be utilized for reduction of alternate supportive equipment and ground personnel required for deployment of the portable passenger boarding ramp. The general purpose of the portable passenger boarding ramp assembly which will be described subsequently in greater detail is to allow for a portable passenger boarding ramp to be driven to the aircraft regardless of where the aircraft is parked. The portable passenger boarding ramp assembly may allow a single operator to drive and position a portable passenger boarding ramp up to an aircraft so as to commence boarding and deplaning of passengers. This portable passenger boarding ramp assembly may include a ramp structure, a series of solar panels, level deck, primary and remote drive consoles, electric drive motors and drive axles with drive engagement lever. In some embodiments, solar panels may be mounted to the exterior of the upper turndeck handrails of the main ramp assembly so as to charge a bank of rechargeable batteries stored in the battery enclosure mounted on at least one side of the main chassis. The power stored in the batteries may energize the electric drive motors with the articulation of dual progressive drive joystick controls. The energizing of the electric motor may subsequently transfer energy to a gear box which may then rotate a drive sprocket. The drive sprocket may transfer torque to the axles through a drive chain resulting in powered movement of the ramp assembly, thus eliminating the need for a towing apparatus as well as any need for ground support personnel to physically push the portable passenger boarding ramp assembly into final position. The level deck may allow for optimal docking conditions if the ramp assembly is not exactly parallel with the aircraft.

BRIEF DESCRIPTION OF THE DRAWINGS

Illustrative embodiments of the disclosure will now be described, by way of example, with reference to the accompanying drawings, in which:

FIG. 10 is a top view of an aircraft parked at an aircraft terminal with an illustrative main solar powered driveable portable passenger ramp assembly deployed at the aircraft in exemplary application thereof.

DETAILED DESCRIPTION

Figure 1:
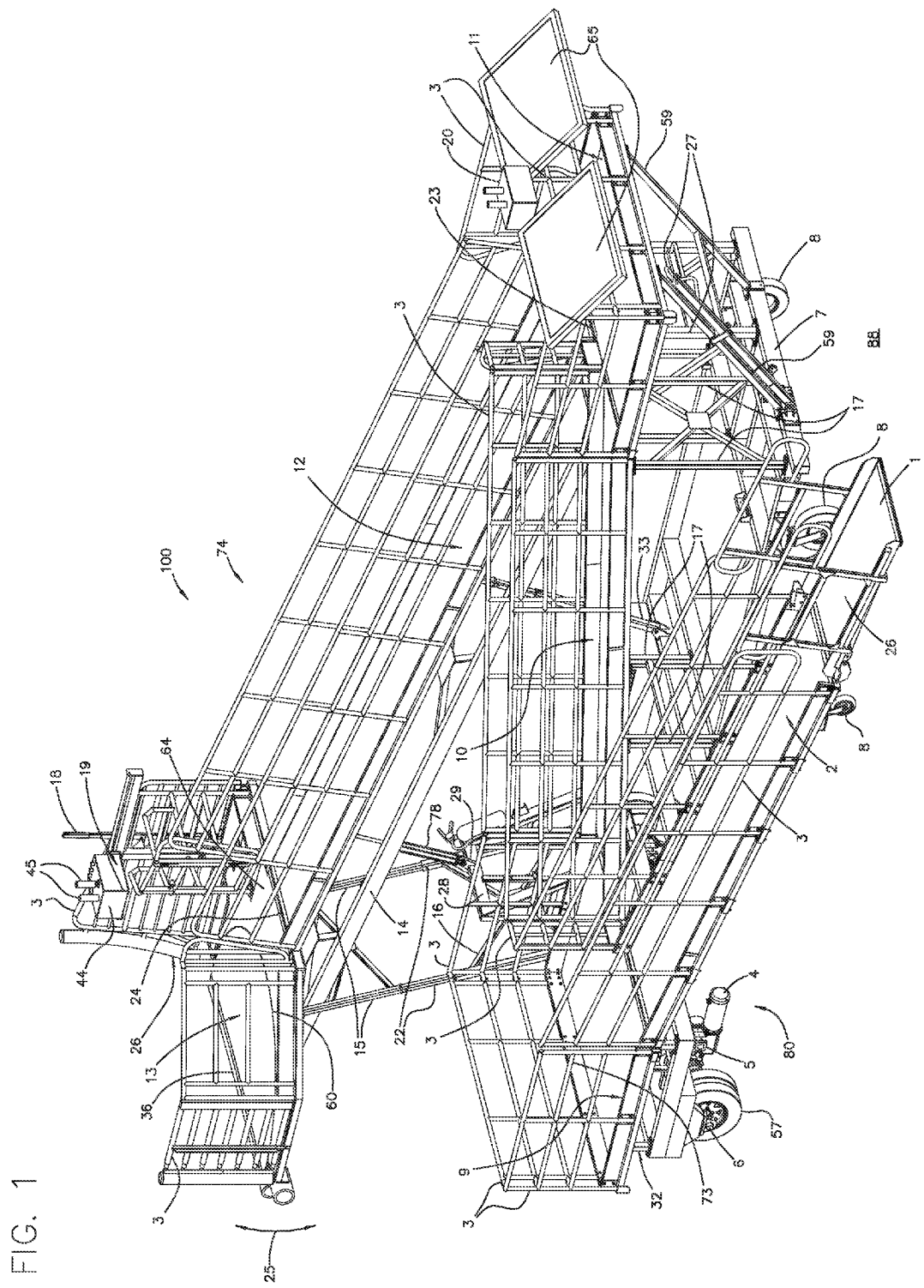
FIG. 1 is an overhead view of an illustrative embodiment of the main solar powered driveable portable passenger ramp assembly.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the claims. Moreover, the illustrative embodiments described herein are not exhaustive and embodiments which are not described herein and which fall within the scope of the claims are possible. Furthermore, there is no intention to be bound by any expressed or implied theory presented in the preceding technical field, background, brief summary or the following detailed description.

With reference to the drawings and, in particular, with reference to FIGS. 1 and 2, an illustrative embodiment of a portable passenger boarding ramp assembly, hereinafter ramp assembly, is generally indicated by reference numeral 100. The ramp assembly 100 has an integrated drive system 80 which may be solar powered and will be hereinafter described. The ramp assembly 100 may include a main frame or chassis 7. At least two independent drive axles 6 with drive wheels 57, driven by operation of dual drive motors 4 via gear boxes 5, may be provided at the forward operating end on the underside of the main chassis 7. At least two swivel wheels 8 may be provided at the aft end on the underside of the main chassis 7.

Figure 6:
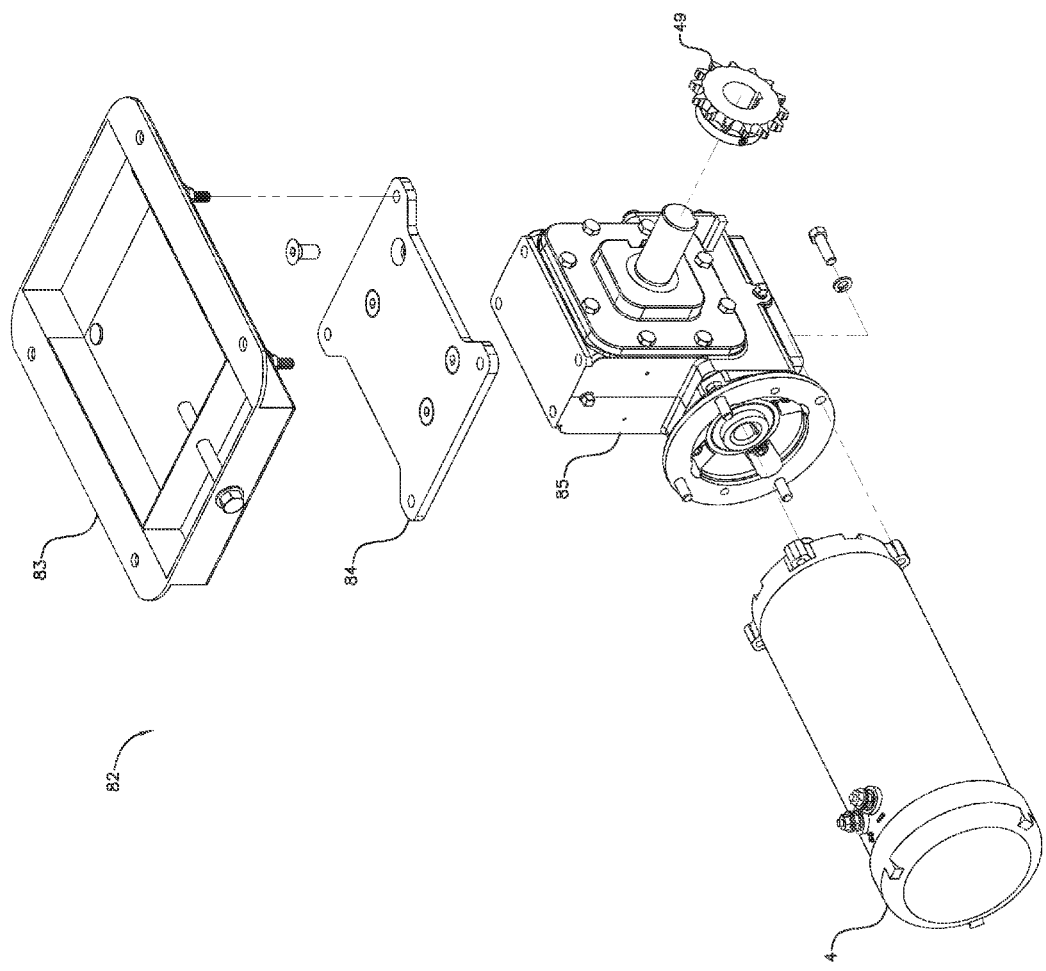
FIG. 6 is an exploded overhead view of an illustrative embodiment of the relationship between the electric drive motor and the gear reduction box.

As illustrated in FIG. 6, a typical motor mounting assembly 82 for each dual drive motor 4 may include a motor mount bracket 83 which is attached to the main chassis 7 using bolts and/or other suitable fastener technique which is known by those skilled in the art (not illustrated). A motor mount plate 84 may be sandwiched between the motor mount bracket 83 and the gear box 5. The motor 4 drivingly engages the gear box 5 and may be attached to a gear box flange 85 on the gear box 5 using bolts and/or other suitable fastener technique which is known by those skilled in the art (not illustrated).

A ramp structure 74 is provided on the main chassis 7. The ramp structure 74 may include a lower turndeck 9 which is supported on the main chassis 7 above the drive axles 6. In some embodiments, the lower turndeck 9 may have a generally rectangular shape. Handrail sections 3 may extend upwardly from the lower turndeck 9 on three sides. The lower turndeck 9 may be attached to the main chassis 7 by way of fixed height, upright support braces 32. As illustrated in FIG. 1, a lower bridge 1 and a lower ramp 2 may slope upwardly from the ground or tarmac 88 onto the lower turndeck 9, with the lower turndeck 9 at an upper end of the lower ramp 2. The sloped lower bridge 1 may be attached to the sloped lower ramp 2 according to the knowledge of those skilled in the art.

A mid ramp 10 may slope upwardly from the lower turndeck 9. The mid ramp 10 may be disposed in adjacent, parallel relationship to the lower ramp 2. Handrail sections 3 may extend upwardly from both sides of the mid ramp 10. The mid ramp 10 may be supported above the main chassis 7 by way of a series of varying height support braces 17.

An upper turndeck 11 may be supported on the main chassis 7 generally above the swivel wheels 8 and at an upper end of the mid ramp 10. The upper turndeck 11 may include a rectangular-shaped platform that is supported above the main chassis 7 such as by an angled H-brace 59 and a bullnose brace 27. The angled H-brace 59 and the bullnose brace 27 may be mounted to the main chassis 7 and to the bottom surface of the upper turndeck 11 according to the knowledge of those skilled in the art. The upper end of the sloped mid ramp 10 is attached to one side of the upper turndeck 11 according to the knowledge of those skilled in the art. Handrail sections 3 may extend upwardly from the remaining sides of the upper turndeck 11.

An upper ramp 12 may slope upwardly from the upper turndeck 11. The upper ramp 12 may be disposed in generally adjacent, parallel relationship to the mid ramp 10. The upper ramp 12 may be attached to the upper turndeck 11 by way of a deck hinge 23 to allow for the upper ramp 12 to pivot upwardly and downwardly relative to the upper turndeck 11, as indicated by the directional arrow 25 in FIG. 1 and for purposes which will be hereinafter described. A hydraulic cylinder 78 may be attached to the underside of the upper ramp 12. The hydraulic cylinder 78 may be supported by an A-brace 28 such as by way of a cylinder mounting tab 29. The A-brace 28 may be attached to the main chassis 7 using any suitable fastening technique known by those skilled in the art. The hydraulic cylinder 78 is operable to selectively raise the upper ramp 12 typically by way of a hand operated hydraulic pump (not pictured) which may be mounted on at least one side of the main chassis 7. At least one telescoping adjustable ramp support arm 33 may be pivotally attached to the main frame 7 and to the upper ramp 12. An arm lock pin (not illustrated) may be used to secure the adjustable ramp support arm 33 at a particular length to support the upper ramp 12 at a desired slope.

Figure 2:
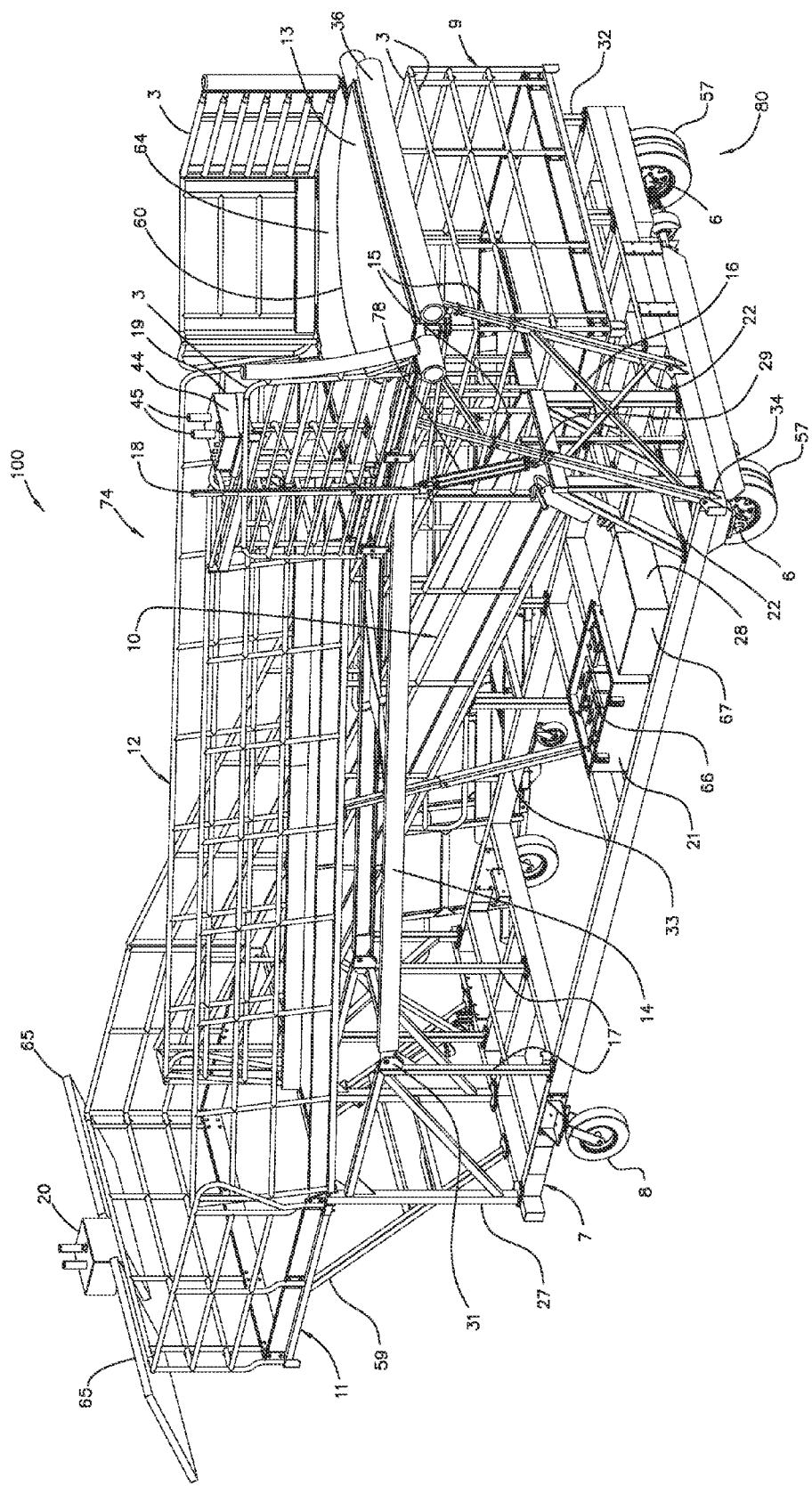
FIG. 2 is an overhead partial view of an illustrative embodiment of the main solar powered driveable passenger ramp assembly.
Figure 3:
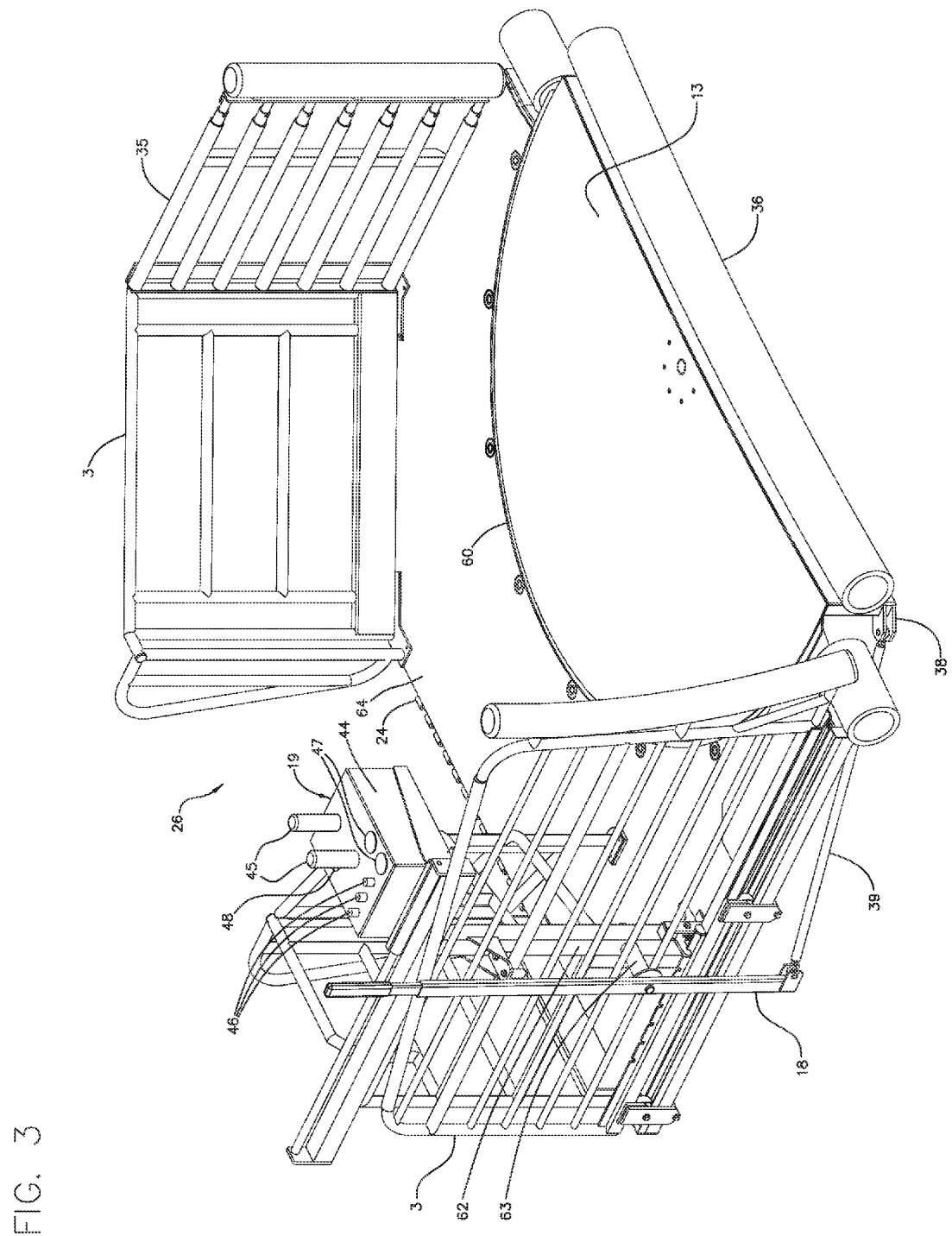
FIG. 3 is a forward view of an illustrative embodiment of the level deck assembly.

As illustrated in FIGS. 1-4, a level deck 13 may be provided at an upper end of the upper ramp 12. The level deck 13 may be vertically pivotally attached to the upper ramp 12 by way of a deck hinge 24 that allows the level deck 13 to remain level during the upwardly and downwardly pivoting motions of the upper ramp 12 typically by actuation of the hydraulic cylinder 78. As particularly illustrated in FIG. 4, the level deck 13 may include a deck frame 37 and a deck platform 64 supported by the deck frame 37. As illustrated in FIG. 3, handrail sections 3 may extend upwardly from the level deck platform 64. At least one main boarding walk space 26 may be provided in the upwardly extending handrail 3 of the level deck 13. At least one deck gate 35 may extend upwardly from the level deck platform 64 to selectively block access to the main boarding walk space 26. In some embodiments, a platform bumper 36 may be provided on the deck frame 37. At least one truss 14 (FIGS. 1 and 2) may be attached to the underside of the level deck 13. The truss 14 may extend rearwardly toward the upper turndeck 11 and pivotally attach to truss connection tabs 31 (FIG. 2) which may be mounted to the upward-standing support bracing 17 according to the knowledge of those skilled in the art.

Figure 4:
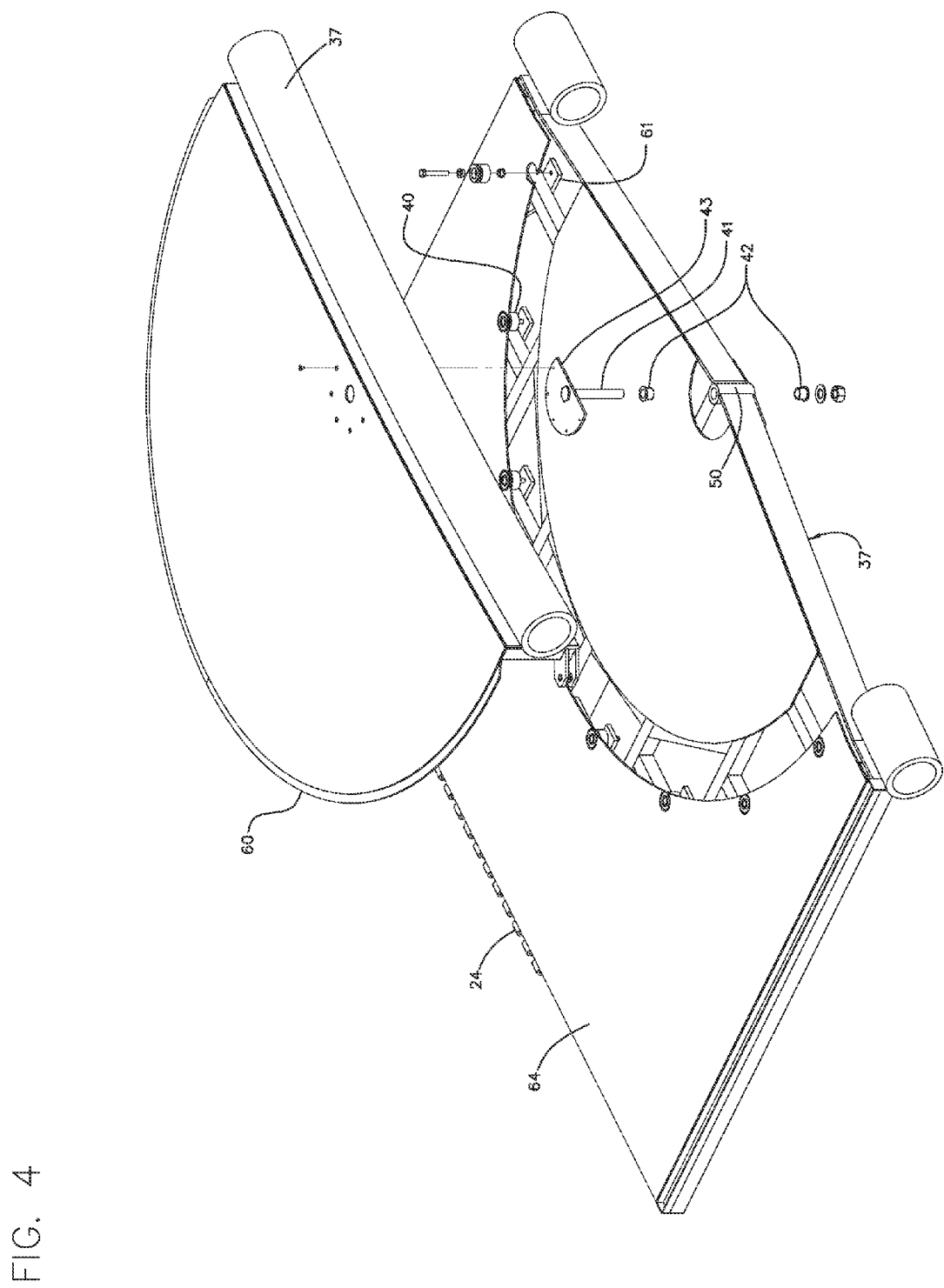
FIG. 4 is an exploded overhead view of an illustrative embodiment of the level deck.
Figure 5:
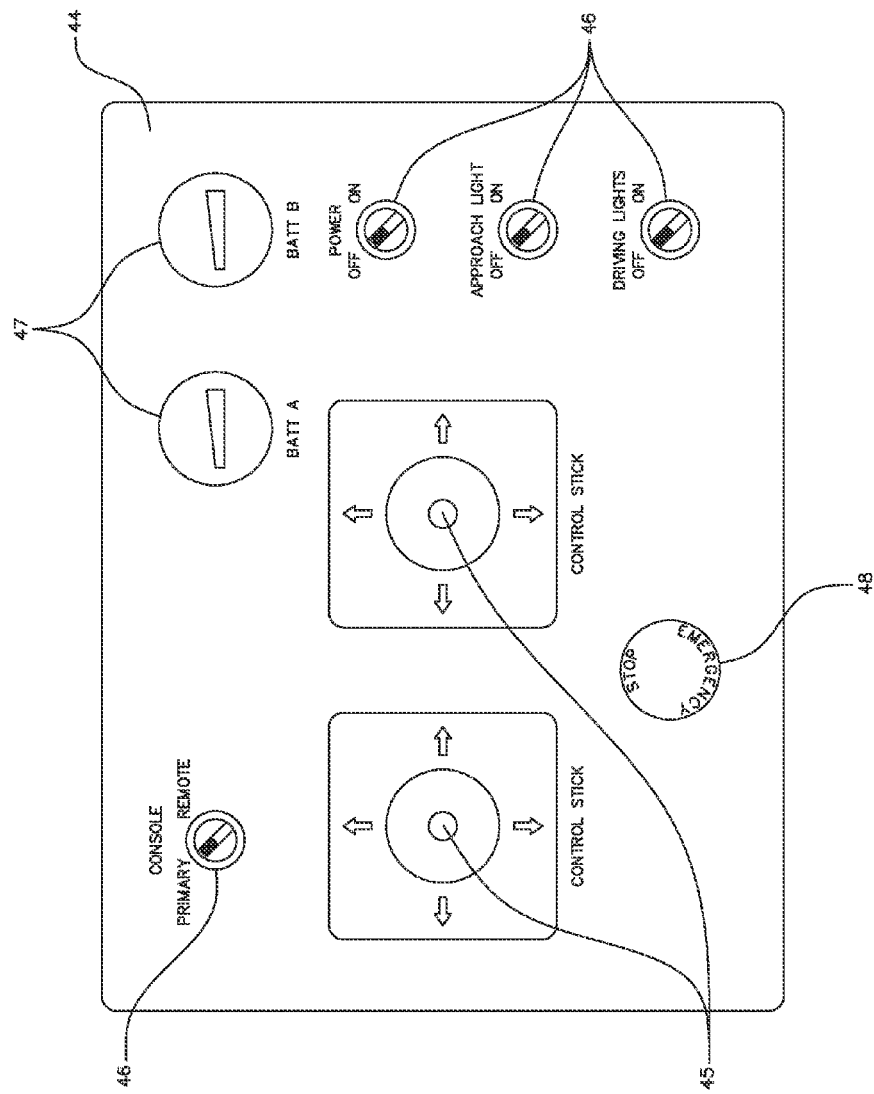
FIG. 5 is an overhead view of an illustrative embodiment of the primary drive console assembly.

As illustrated in FIGS. 3 and 4, a deck rotunda 60 which may have a generally semicircular shape may be rotationally pivotally mounted on the deck frame 37 of the level deck 13 according to the knowledge of those skilled in the art. As illustrated in FIG. 4, the deck rotunda 60 may be attached to the level deck platform 64 by way of a pivot mounting plate 43, from which extends a pivot shaft 41 that pivotally extends through a shaft collar 50 in the platform frame 37 with at least one bushing 42. The deck rotunda 60 may rest on rollers 40 which are attached to the deck frame 37 of the level deck 13 such as by way of roller mounting tabs 61. As illustrated in FIG. 3, on at least one side of the level deck 13, a pivot lever 18 may be connected to a pivot linkage arm 39, which is in turn connected to the deck rotunda 60 at a pivot bracket 38. The pivot lever 18 may be pivotally mounted to a pivot bushing 63 which is fastened to a roller gate support column 62 that is upward-standing from the level deck platform 64. Accordingly, with forward pivoting movement of the pivot lever 18 about the pivot bushing 63, the pivot linkage arm 39 moves aft, resulting in a clockwise articulation or rotational pivoting of the deck rotunda 60 relative to the level deck platform 64 via the pivot shaft 41 (FIG. 4). Alternately, aft or backward movement of the pivot lever 18 pushes the pivot lever linkage arm 39 forward, resulting in counter-clockwise articulation or rotational pivoting of the deck rotunda 60 relative to the level deck platform 64 via the pivot shaft 41. The deck rotunda 60 can be pivoted in the side-to-side motion via operation of the pivot lever 18, as heretofore described, to achieve optimal docking conditions in the event that the level deck 13 is not properly parallel with an aircraft (not illustrated) to which the ramp assembly 100 is to be docked.

As illustrated in FIG. 1, a pair of sliding supports 15 may extend upwardly from the main chassis 7. The sliding supports 15 may be attached to the underside of the level deck 13 by way of sliding support mounting tabs (not illustrated). A series of openings (not illustrated) may extend along each of the sliding supports 15. The sliding supports 15 may be inserted through square tubing sleeves 22 which form the perimeter frame of an X-brace 16. The X-brace 16 may be attached to the main chassis 7 by way of X-brace mounting tabs 34 (FIG. 2). As the upper ramp 12 is pivoted in an upward manner typically by operation of the hydraulic cylinder 78, the sliding supports 15 extend both upwardly and outwardly from the respective sleeves 22. Once the desired height of the level deck 13 has been achieved, a lock pin (not illustrated) can be inserted through the registering openings (not illustrated) in the sliding supports 15 and in the sleeves 22, respectively, to secure the level deck 13 at the selected height.

As further illustrated in FIGS. 1-5, a primary drive console 19 may be provided on the level deck 13 at the fore end of the ramp assembly 100. A secondary drive console 20 may be provided on the upper turndeck 11 at the aft end of the ramp assembly 100. The primary drive console 19 may be mounted to a handrail section 3 that extends upward from the level deck 13. The primary drive console 19 may include a console enclosure 44 which contains the wiring of, and provides a means of attachment for, dual progressive joystick controls 45, two position switches 46, battery charge gauges 47 and an emergency stop button 48. The secondary drive console 20 may be mounted to a handrail section 3 that extends upward from the upper turndeck 11 at the aft end of the ramp assembly 100. The secondary drive console 20 may have the same structural and control components as the primary drive console 19. In other embodiments, the primary drive console 19 and the secondary drive console 20 may be provided at alternative locations on the ramp structure 74.

The primary drive console 19 and the secondary drive console 20 are connected to the electric dual drive motors 4 for selective operation of the drive axles 6 and respective drive wheels 57 in the forward or reverse direction. At least one solar panel 65 may be electrically connected to the dual drive motors 4, typically via at least one rechargeable battery 66 (FIG. 2), to provide a source of electrical current for the dual drive motors 4. By movement of the dual progressive drive joysticks 45 at either the primary drive console 19 or the secondary drive console 20, electric current is directed from the rechargeable battery 66 to the dual drive motors 4. The dual drive motors 4 energize the gear boxes 5, which turn a meshing gear drive sprocket 49 (FIG. 6). Torque may be transferred from the gear drive sprocket 49 to the drive axles 6 through a drive chain or heavy roller chain (not illustrated) which meshes with a drive axle sprocket gear 56 (FIG. 7) on each drive axle 6 for movement of the ramp assembly 100 in the selected forward or reverse direction.

In some embodiments, at least four of the solar panels 65 may be mounted in pairs of two on the ramp structure 74, such as on the exterior of the handrails of the upper turndeck 11 as well as the lower turndeck 9 of the ramp assembly 100, for example and without limitation, according to the knowledge of those skilled in the art. The solar energy collected by the solar panels 65 may be transmitted to solar controllers (not pictured) which direct electrical current to the rechargeable batteries 66 (FIG. 2) that may be contained in a battery enclosure 21 on the main chassis 7. The electrical power which is stored in the rechargeable batteries 66 is available to the dual drive motors 4 upon operation of any of the two position switches 46 and the joystick controls 45 located on the primary drive console 19 and the secondary drive console 20.

Figure 9:
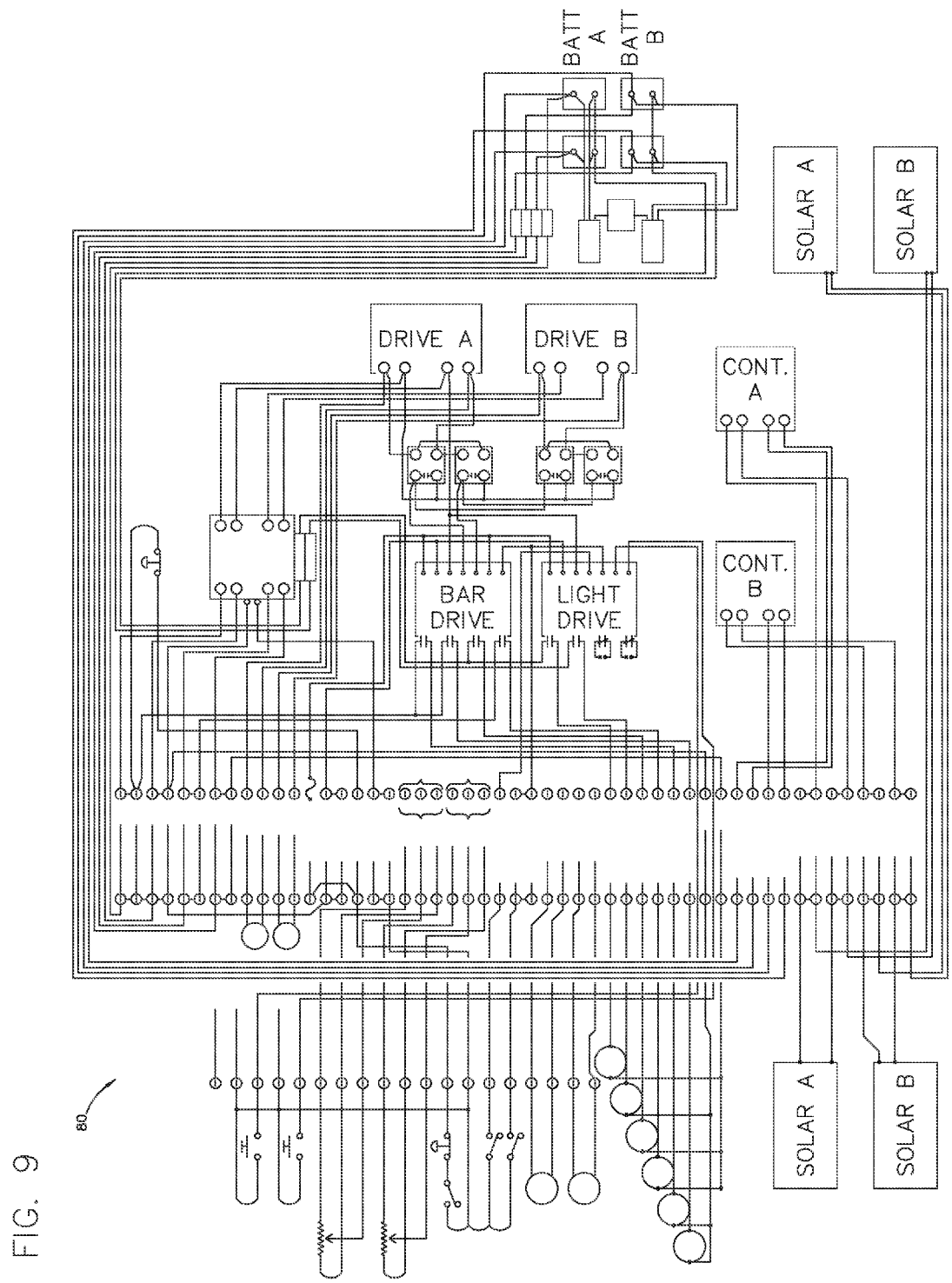
FIG. 9 is a schematic drawing illustrating power distribution.

As will be hereinafter described, the primary drive console 19 may be operated to transport the ramp assembly 100 toward an aircraft 89 (FIG. 10) to which the ramp assembly 100 is to be docked for deplaning and boarding of passengers on the aircraft 89. The secondary drive console 20 may be operated to transport the ramp assembly 100 when a canopy or awning structure (not illustrated) is mounted above the ramp structure 74 of the ramp assembly 100, and therefore, may otherwise obstruct or hinder the view of an operator at the primary drive console 19. The secondary drive console 20 may also provide better visibility to an operator when the ramp assembly 100 is to be driven away from the aircraft 89 to which the ramp assembly 100 was docked, typically after boarding of passengers on the aircraft 89. The drive system 80 for the drive axles 6 may include various other components such as microprocessor control boards 67 (FIG. 2) and the rechargeable batteries 66, for example and without limitation, in addition to the primary drive console 19, the secondary drive console 20, the solar panels 65, the dual drive motors 4, the gear boxes 5 and the drive axles 6. A typical electrical schematic diagram for the drive system 80 is illustrated in FIG. 9.

Figure 7:
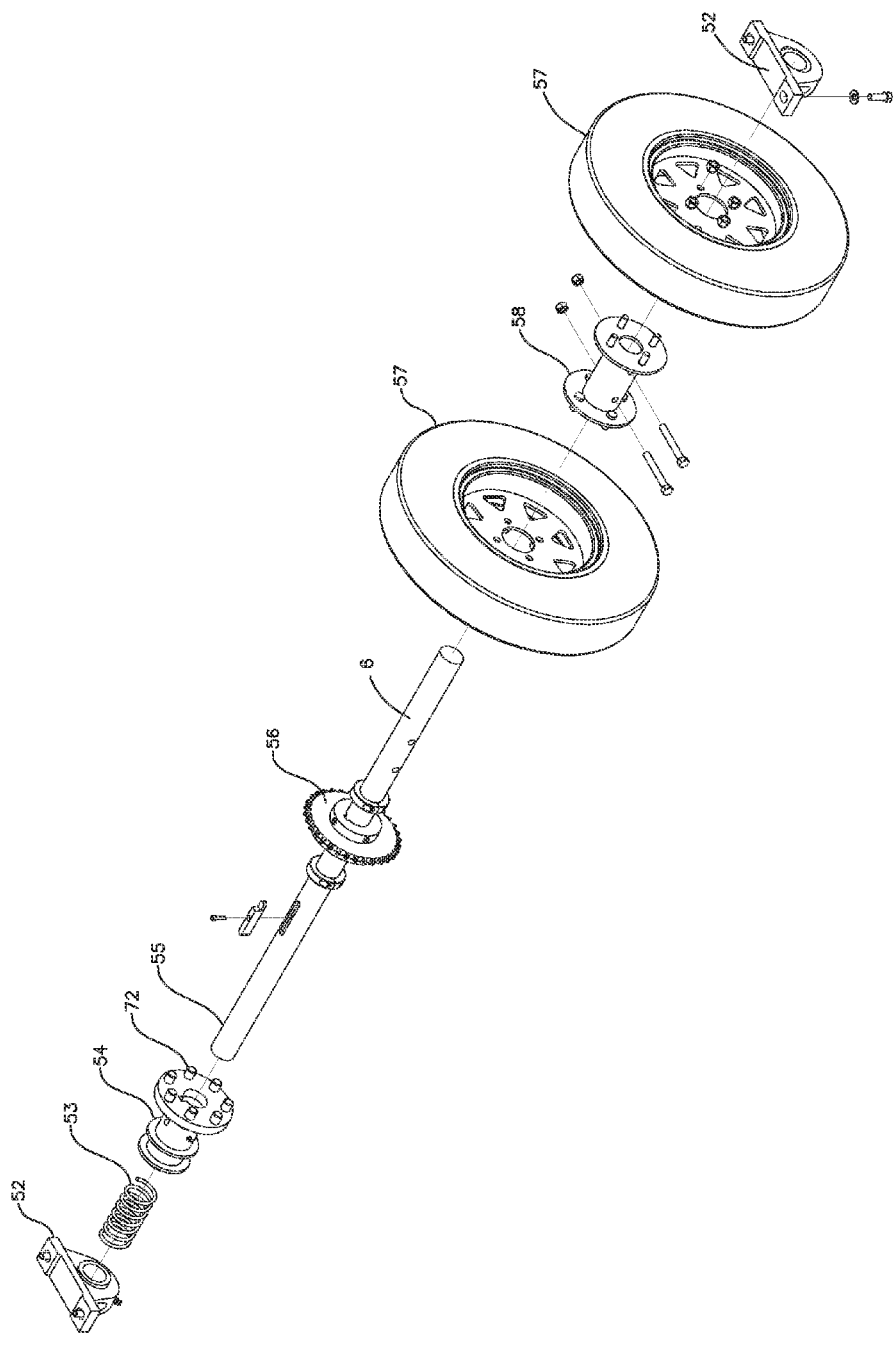
FIG. 7 is an exploded overhead view of an illustrative embodiment showing the components of the drive axle.
Figure 8:
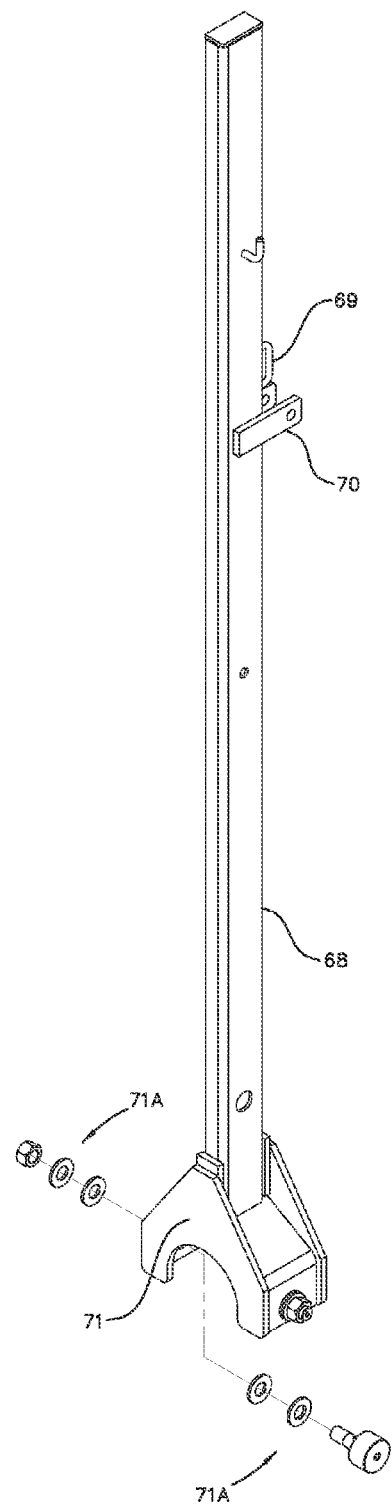
FIG. 8 is an overhead view of an illustrative embodiment of the hub release lever.

Referring now to FIGS. 7 and 8 of the drawings, in some embodiments, the two independent drive axles 6 can be selectively engaged and disengaged by articulation of a hub release lever 68 (FIG. 8) so as to place the drive system 80 into a neutral state, allowing for the ramp assembly 100 to be relocated by towing or by manually pushing of the ramp assembly 100, as well as conducting safe preventative maintenance. The hub release lever 68 may include a section of rectangular tube steel having on one end a clevis connecter 71 that allows for a pivoting connection to a locking engagement hub 54 (FIG. 7) which is slidably mounted on the drive axle 6 using attachment bolts 71A. Each drive axle 6 may be mounted on the main chassis 7 via a pair of axle mount bearing brackets 52. A drive axle shaft 55 extends from the drive axle 6. A hub engagement spring 53 engages the locking engagement hub 54. A wheel hub 58 is mounted on the drive axle 6. At least one drive wheel 57 is mounted on the wheel hub 58.

The hub release lever 68 can be selectively locked in the neutral position by way of a locking chain (not pictured) that fits into a keyhole slot machined into a tab of steel (not pictured) fastened to the steel A-frame support 28 (FIG. 2) on the main chassis 7. Upon release of the lock chain, the hub engagement spring 53 (FIG. 7) decompresses and moves the locking engagement hub 54 down the drive axle shaft 55, allowing for reengagement of the locking engagement hub 54 with the drive axle sprocket gear 56. This reengagement is accomplished when the locking engagement hub 54 that is attached to the clevis connector 71 (FIG. 8) of the hub release lever 68 and slides horizontally along the drive axle shaft 55 is mated with the drive axle sprocket gear 56. The locking engagement hub 54 may have multiple protruding lugs 72 of cylindrical shape that engage into corresponding pockets (not pictured) in the drive axle sprocket gear 56 of the drive axle 6.

With reference to the drawings and, in particular, FIG. 10, the ramp assembly 100 can be selectively transported on the tarmac 88 to a deployed position for the deplaning and boarding of passengers on an aircraft 89 which is parked at a terminal at an airport (not illustrated). Accordingly, an operator (not illustrated) may stand on the level deck 13 and manipulate the controls at the primary drive console 19 to advance the ramp assembly 100 toward the aircraft 89. After the ramp assembly 100 arrives at a position which is adjacent to the aircraft 89, the height of the upper ramp 12 and the level deck 13 may be adjusted, typically by operation of the hydraulic cylinder 78, until the level deck platform 64 is substantially level with a cabin door 90 on the aircraft 89. As the hydraulic cylinder 78 raises the upper ramp 12 and the level deck 13, the level deck 13 may pivot with respect to the upper ramp 12 via the deck hinge 24 to maintain the level deck 13 in a substantially horizontal position. In the event that the ramp assembly 100 is positioned such that the level deck 13 is not aligned in parallel relationship to the longitudinal axis of the aircraft 89, the pivot lever 18 (FIG. 3) may be manipulated to rotationally pivot the deck rotunda 60 relative to the level deck platform 64, as was heretofore described, such that the platform bumper 36 is parallel to the longitudinal axis of the aircraft 89 and engages the aircraft 89 at the cabin door 90. Alternatively, the ramp assembly 100A may be positioned at a rear cabin door 90A.

A deplaning group of passengers (not illustrated) exits the aircraft 89 by walking from the cabin door 90, and then across the deck rotunda 60 and the level deck platform 64, respectively, and through the main boarding walk space 26 between the handrail sections 3 of the ramp assembly 100. The deplaning passengers then descend the upper ramp 12, the upper turndeck 11, the mid ramp 10, the lower turndeck 9, the lower ramp 2 and the lower bridge 1, respectively. The deplaning passengers may then walk across the tarmac 88 to the gate of the terminal. A boarding group of passengers (not illustrated) may subsequently walk from the gate of the terminal across the tarmac 88 and ascend the lower bridge 1, the lower ramp 2, the lower turndeck 9, the mid ramp 10, the upper turndeck 11, the upper ramp 12 and the level deck 13, respectively, of the ramp assembly 1 and enter the aircraft 89 by walking from the level deck 13 through the cabin door 90.

After the boarding passengers have boarded the aircraft 89, the ramp assembly 1 may be backed away from the aircraft 89 preparatory to departure. Reverse transport of the ramp assembly 1 on the tarmac 88 away from the aircraft 89 may be accomplished by an operator who typically stands on the upper turndeck 11 while manipulating the controls at the secondary drive console 20. A second aircraft 89 subsequently lands and then arrives and parks at the terminal, after which the ramp assembly 100 is again driven on the tarmac 88 until the level deck 13 is disposed adjacent to the cabin door 90. The hydraulic cylinder 78 may again be operated to adjust the slope of the upper ramp 12 and the height of the level deck 13 depending on the height of the cabin door 90. The position of the deck rotunda 60 may again be adjusted by operation of the pivot lever 18 (FIG. 3) to align the deck rotunda 60 with respect to the aircraft 89. Passengers can be subsequently deplaned from and boarded onto the aircraft 89 and additional aircraft 89 in a similar manner. In some applications, canopies (not illustrated) may be deployed over the lower ramp 2, the lower turndeck 9, the mid ramp 10, the upper turndeck 11, the upper ramp 12 and/or the level deck 13 of the ramp structure 74 to shield the passengers from the sun or inclement weather during deplaning and boarding of the aircraft 89.

While certain illustrative embodiments of the disclosure have been described above, it will be recognized and understood that various modifications can be made to the embodiments and the appended claims are intended to cover all such modifications which may fall within the spirit and scope of the disclosure.

What is claimed is:

1. A ramp assembly, comprising:
   a main chassis having a plurality of drive wheels;
   a ramp structure carried by the main chassis, the ramp structure including:
      a lower ramp sloping upwardly to the main chassis;
      a lower turndeck carried by the main chassis at an upper end of the lower ramp;
      a mid ramp carried by the main chassis, the mid ramp sloping upwardly from the lower turndeck;
      an upper turndeck carried by the main chassis at an upper end of the mid ramp;
      an upper ramp carried by the main chassis, the upper ramp sloping upwardly from the upper turndeck; and
      a level deck carried by the main chassis and disposed in vertically pivoting relationship to the upper ramp; and
   a drive system drivingly engaging the plurality of drive wheels, the drive system including at least one drive console carried by the ramp structure and operably connected to the plurality of wheels to facilitate driving of the ramp assembly among different locations on an airport tarmac, wherein the at least one drive console comprises a primary drive console and a secondary drive console.

2. The ramp assembly of claim 1 wherein the primary drive console is carried by the level deck and a secondary drive console carried by the upper turndeck.

3. A ramp assembly, comprising:
   a main chassis having a plurality of drive wheels;
   a ramp structure carried by the main chassis, the ramp structure including:
      a lower ramp sloping upwardly to the main chassis;
      a lower turndeck carried by the main chassis at an upper end of the lower ramp;
      a mid ramp carried by the main chassis, the mid ramp sloping upwardly from the lower turndeck;
      an upper turndeck carried by the main chassis at an upper end of the mid ramp;
      an upper ramp carried by the main chassis, the upper ramp sloping upwardly from the upper turndeck; and
      a level deck carried by the main chassis and disposed in vertically pivoting relationship to the upper ramp; and
   a drive system drivingly engaging the plurality of drive wheels, the drive system including a primary drive console and a secondary drive console operably connected to the plurality of drive wheels, the primary drive console and the secondary drive console carried by the ramp structure.

4. The ramp assembly of claim 3 wherein the primary drive console is carried by the level deck and the secondary drive console is carried by the upper turndeck of the ramp structure.

5. The ramp assembly of claim 1 wherein the drive system is solar-powered.

6. The ramp assembly of claim 5 wherein the drive system comprises at least one solar panel carried by the ramp structure and at least one rechargeable battery electrically connected to the at least one solar panel and the plurality of drive wheels.

7. The ramp assembly of claim 1 further comprising a hydraulic cylinder carried by the main chassis and engaging the upper ramp, the hydraulic cylinder operable to selectively raise and lower the upper ramp and the level deck.

8. A ramp assembly, comprising:
a main chassis having a plurality of drive wheels;
a ramp structure carried by the main chassis, the ramp structure including:
   a lower ramp sloping upwardly to the main chassis;
   a lower turndeck carried by the main chassis at an upper end of the lower ramp;
   a mid ramp carried by the main chassis, the mid ramp sloping upwardly from the lower turndeck;
   an upper turndeck carried by the main chassis at an upper end of the mid ramp;
   an upper ramp carried by the main chassis, the upper ramp sloping upwardly from the upper turndeck; and
   a level deck carried by the main chassis and disposed in vertically pivoting relationship to the upper ramp, the level deck having:
      a deck frame;
      a level deck platform carried by the deck frame;
      a deck rotunda rotationally pivotally carried by the deck frame adjacent to the level deck platform; and
      a pivot lever engaging the deck rotunda, the pivot lever operable to selectively rotationally pivot the deck rotunda relative to the level deck platform; and
a drive system drivingly engaging the plurality of drive wheels, the drive system including at least one drive console carried by the ramp structure and operably connected to the plurality of wheels to facilitate driving of the ramp assembly among different locations on an airport tarmac, wherein the at least one drive console comprises a primary drive console and a secondary drive console.

9. The ramp assembly of claim 8 wherein the primary drive console is carried by the level deck and a secondary drive console carried by the upper turndeck.

10. The ramp assembly of claim 8 wherein the drive system is solar-powered.

11. The ramp assembly of claim 10 wherein the drive system comprises at least one solar panel carried by the ramp structure and at least one rechargeable battery electrically connected to the at least one solar panel and the plurality of drive wheels.

12. The ramp assembly of claim 8 further comprising a hydraulic cylinder carried by the main chassis and engaging the upper ramp, the hydraulic cylinder operable to selectively raise and lower the upper ramp and the level deck.

13. A ramp assembly, comprising:
a main chassis having a plurality of drive wheels;
a ramp structure carried by the main chassis, the ramp structure including:
   a lower ramp sloping upwardly to the main chassis;
   a lower turndeck carried by the main chassis at an upper end of the lower ramp;
   a mid ramp carried by the main chassis, the mid ramp sloping upwardly from the lower turndeck;
   an upper turndeck carried by the main chassis at an upper end of the mid ramp;
   an upper ramp carried by the main chassis, the upper ramp sloping upwardly from the upper turndeck; and
   a level deck carried by the main chassis and disposed in vertically pivoting relationship to the upper ramp, the level deck having:
      a deck frame;
      a level deck platform carried by the deck frame;
      a deck rotunda rotationally pivotally carried by the deck frame adjacent to the level deck platform; and
      a pivot lever engaging the deck rotunda, the pivot lever operable to selectively rotationally pivot the deck rotunda relative to the level deck platform; and
a drive system drivingly engaging the plurality of drive wheels, the drive system including a primary drive console and a secondary drive console operably connected to the plurality of drive wheels, the primary drive console and the secondary drive console carried by the ramp structure.

14. The ramp assembly of claim 13 wherein the primary drive console is carried by the level deck and the secondary drive console is carried by the upper turndeck of the ramp structure.

15. A ramp assembly, comprising:
a main chassis having a plurality of drive wheels and a plurality of swivel wheels;
a ramp structure carried by the main chassis, the ramp structure including:
   a lower ramp sloping upwardly to the main chassis;
   a lower turndeck carried by the main chassis at an upper end of the lower ramp;
   a mid ramp carried by the main chassis, the mid ramp sloping upwardly from the lower turndeck;
   an upper turndeck carried by the main chassis at an upper end of the mid ramp;
   an upper ramp carried by the main chassis, the upper ramp sloping upwardly from the upper turndeck; and
   a level deck carried by the main chassis and disposed in vertically pivoting relationship to the upper ramp, the level deck having:
      a deck frame;
      a level deck platform carried by the deck frame;
      a generally semicircular deck rotunda rotationally pivotally carried by the deck frame adjacent to the level deck platform; and
      a pivot lever engaging the deck rotunda, the pivot lever operable to selectively rotationally pivot the deck rotunda relative to the level deck platform; and
a drive system drivingly engaging the plurality of drive wheels, the drive system including:
   dual drive motors drivingly engaging the plurality of drive wheels;
   at least one rechargeable battery electrically connected to the dual drive motors;
   at least one solar panel carried by the ramp structure, the at least one solar panel electrically connected to the at least one rechargeable battery;
   a primary drive console carried by the level deck, the primary drive console electrically connected to the dual drive motors; and
   a secondary drive console carried by the upper turndeck, the secondary drive console electrically connected to the dual drive motors.

16. The ramp assembly of claim 15 further comprising a hydraulic cylinder carried by the main chassis and engaging the upper ramp, the hydraulic cylinder operable to selectively raise and lower the upper ramp and the level deck.

17. The ramp assembly of claim 15 further comprising a platform bumper carried by the deck frame.

18. The ramp assembly of claim 15 further comprising a plurality of support braces extending between the main chassis and the mid ramp and at least one truss pivotally carried by the plurality of support braces and attached to the upper turndeck.

* * * * *